May 14, 1963     H. KLAASSEN     3,089,548
CONTROL DEVICE FOR VARIABLE PITCH PROPELLERS
Filed April 4, 1960
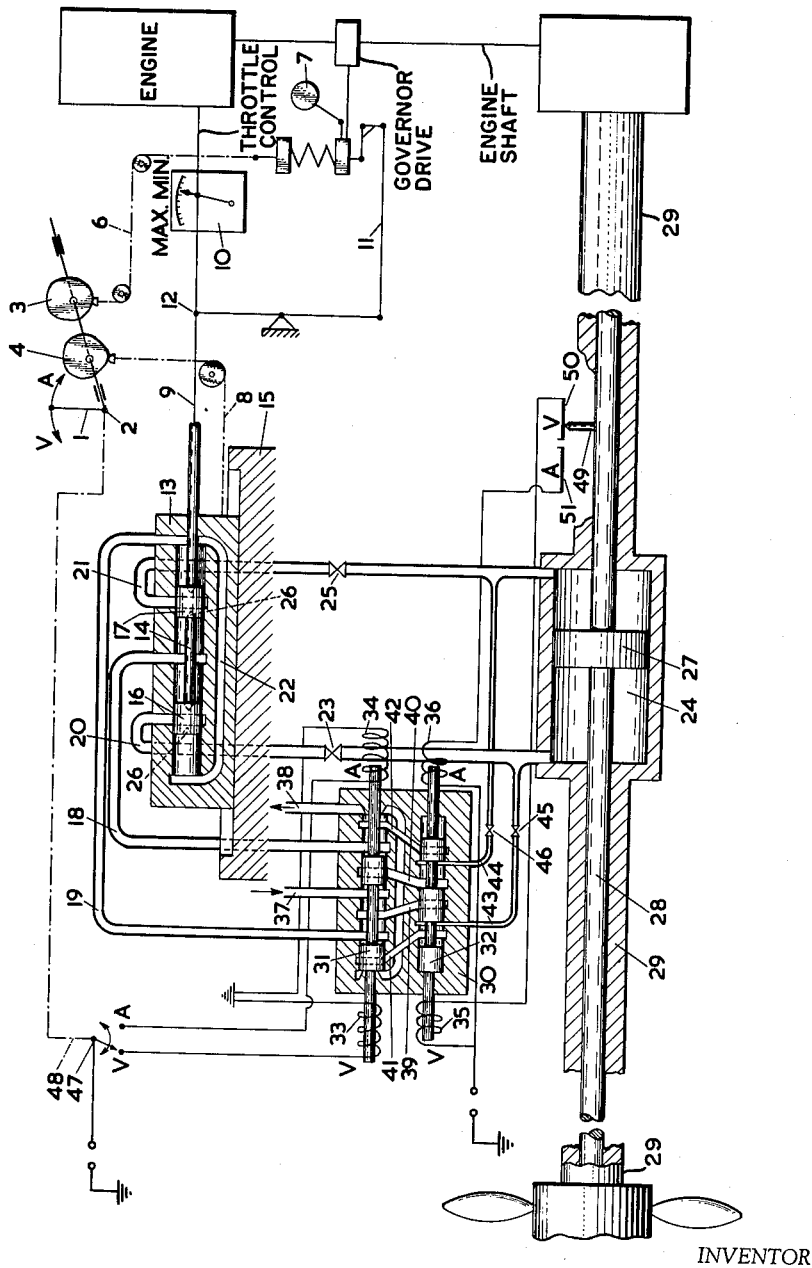
INVENTOR
*HENDRIK KLAASSEN*
BY
ATTORNEY United States Patent Office 3,089,548
Patented May 14, 1963

3,089,548
CONTROL DEVICE FOR VARIABLE PITCH PROPELLERS
Hendrik Klaassen, Drunen, Netherlands, assignor to Lips N.V., Drunen, Netherlands, a Dutch corporation
Filed Apr. 4, 1960, Ser. No. 19,776
Claims priority, application Netherlands Apr. 7, 1959
6 Claims. (Cl. 170—135.74)

The invention relates to an adjusting and control device for an installation on board ship comprising a driving engine driving a propeller with adjustable blades which device simultaneously influences the pitch of the blades, the number of revolutions of the driving engine and the power thereof.

Similar devices are known in several embodiments. For instance, a device is known wherein the pitch of the propeller blades is adjusted simultaneously with pressing in the spring of the centrifugal governor of the driving engine. Thus, in normal circumstances, a certain number of engine revolutions is adjusted for each adjusted pitch of the propeller. In case of a change of conditions the cam members, which are rotated for the adjustment, may be displaced along their shafts to influence the pitch of the propeller and the number of revolutions according to a different mutual relationship. An automatic influencing means dependent on changing conditions is not provided here, and specially with suddenly changing conditions this involves a very unfavorable situation arising for the installation. Also, with prolonged operation under the same conditions these conditions are very hard to judge. They may depend on the plant and animal growth on the ship's hull, the draft, the sea, with a tug on the question of more or less heavy tows, and on various other circumstances. In practice, this known device in fact works in such a manner that the conditions for the driving engine are practically never optimum.

Instead of the pressure spring of the centrifugal governor or a similar member thereof it is also known to influence the fuel admission means proper together with the pitch of the propeller.

Also, a device for varying the pitch of the blades of a propeller is known wherein the position of a controlling member for the admission of working medium to the turbine, influenced by a centrifugal governor, influences the extreme positions of the propeller blade adjustment while not influencing the intermediate propeller blade adjustment. In consequence of this the pitch never exceeds a value, justified in connection with the maximum available shaft torque.

In this prior art there is no complete adaptation to the varying conditions as mentioned above, in the sense that the driving engine is thereby given the opportunity continually to work in optimum circumstances.

The invention aims at improving this, and under all conceivable varying conditions to let the driving engine work continuously at the point of its characteristic curve forming the locus of the most favourable working points for the assembly formed by the engine and the adjustable propeller.

To this and according to the invention it is suggested to embody the device in such a manner, that at least in the ranges of not too small a pitch of the blades, it unequivocally imposes on the driving engine a prescribed relation between the number of revolutions and the output, in such a manner that the combination of driving engine and propeller works with an efficiency which is optimum under all conditions. Thus the desired characteristic curve of the optimum working conditions of the driving engine is automatically retained in full.

According to the invention this is preferably realized in such a manner, that on the one hand the adjusting device adjusts the position of the member which determines the admission of working medium (fuel, steam and suchlike) to the driving engine and together with that the adjustable part of the speed governing device which latter device acts on the admission member for the working medium, a flexible connection being included in the adjustment of the admission member, which flexible connection, in case of the admission member deviating from the adjusted position with respect to the actual position, adjusts the pitch of the propeller blades in a direction causing a displacement of the admission member towards the adjusted position depending on the number of revolutions of the engine.

According to the invention a selected is therefore made out of three variables that can be influenced, namely the supply of working medium to the driving engine, the number of revolutions, and the pitch of the blades, so that the first are selected to be independent variables. Thus in any working condition the whole plant works with the maximum efficiency that can be achieved for that working condition. If, on the other hand, one chooses the pitch and the number of revolutions as independent variables, a widely diverging number of values of the supply of working medium to the driving engine is then possible, which in each case depends on the working conditions and consequently on the velocity of the water flow to the propeller, the whole plant therewith mostly remaining far removed from the highest attainable efficiency in the relative conditions.

One or two problems which still appear in putting the invention into practice and for which, in a further development, the invention offers preferential possibilities are the achievement of a quick adjustment coupled with sufficiently damping the adjustment movement near the desired position of the propeller blades, on the one hand to achieve a quick reaction and on the other hand to prevent oscillation of the propeller blade adjustment about the desired position, and further the solution for the neutral position of the propeller blades. It should be prevented that near the neutral position the propeller blades for instance react with a larger pitch angle in the direction for steaming astern when they should take up a smaller pitch angle in the direction for steaming ahead. With a very slight pitch, moreover, the torque and the output of the engine are normally very low, so that apart from reacting in the wrong direction, the stability of the control device also will be small and depend strongly on small changes of conditions, for instance roughness of the propeller surface, if no special measures are taken.

The invention will now be further explained with reference to the accompanying diagrammatic drawing of a hydraulic adjusting and control device according to the invention in a preferential embodiment.

A control lever 1 is movable along a scale showing different output positions and steaming ahead or astern with a ship which, in this case. is supposed to be provided with a combustion engine or combustion turbine driving a propeller with adjustable blades for the propulsion of the ship. By moving the lever 1 it rotates round the center line of a shaft 2 carrying cams 3 and 4, fixed through the shaft 2 to the lever 1. Via a linkage 6 cam 3 adjusts the adjustable part of the speed governing device, in this case the pressure of a spring on a centrifugal governor 7. Cam 4 acts via an assembly of connecting members 8, 9 on the position of the member determining the admission of working medium to the driving engine, in this case on the fuel admission regulating member 10, for the adjustment thereof. The centrifugal governor 7 acts in a normal way via a connection 11 on the fuel regulating member 10, the connections 11 and 12 being connected to the adjusting part 9.

The connecting members 8 and 9 are inter-connected by a flexible connection formed by a casing 13 fixed to member 8 and a slide valve 14 movable therein and secured to member 9. The casing 13 is movable along a fixed support 15. The slide valve 14 is formed by a rod with two cylindrical piston parts 16 and 17.

Casing 13 communicates with four conduits 18, 19, 20 and 21. Conduit 18 opens in the center of casing 13 and conduit 19 in both ends of casing 13 via a connecting conduit 22.

Conduit 20 is connected via a manually adjustable throttle member 23 with the left hand end and conduit 21 via a manually adjustable throttle member 25 with the other end of the adjusting cylinder 24 for adjusting the blade pitch of a propeller.

The cylindrical piston parts 16 and 17 of the slide valve 14 normally shut off the debouchments of conduits 20 and 21 in casing 13 completely and are wider, as seen in the axial direction, than these debouchments, grooves 26 being provided at both sides, which grooves deepen and/or widen towards the ends, so that in case of slight deviations in position between slide valve 14 and casing 13 hydraulic medium from the chamber in casing 13 can reach conduits 20 and 21 through these grooves or vice versa via a number of such grooves which will throttle this fluid strongly and the more strongly as the deviation in relative position of parts 13 and 14 is slighter. In consequence of this a very sensitive but stable control is possible.

Within the adjusting cylinder 24 an adjusting piston 27 is located mounted on an adjusting rod 28 which passes through the hollow propeller shaft 29 to the propeller hub in which hub it can adjust the pitch of the propeller blades.

An auxiliary shut-off valve device has a casing 30 containing two cylindrical displaceable shut-off members 31 and 32 arranged alongside one another. Both these shut-off members are longitudinally displaceable electrically by solenoids 33, 34, 35 and 36. A supply conduit 37 for hydraulic medium opens in the center of the space for the shut-off member 31. The aforementioned conduits 18 and 19 in this space open at equal distances on either side of conduit 37, both ends of this space again being connected with a discharge conduit 38 for hydraulic medium leading to a suitable container from where a pump can pump this medium to conduit 37.

The spaces for shut-off members 31 and 32 are inter-connected by four conduits, viz. on the one hand by conduits 39 and 40 symmetrically arranged with regard to conduit 37 and on the other hand by conduits 41 and 42 symmetrically arranged with regard to conduit 37, as shown. Leaving the space for shut-off member 32 again, two conduits 43 and 44 open in the conduits 20 and 21 respectively mentioned before and are provided with suitable manually adjustable throttle members 45 and 46.

Shut-off member 31 has two cylindrical shut-off piston bodies, as shown, and under the influence of the solenoids, in position of rest, takes up the extreme left-hand or the extreme right-hand position. In the extreme left-hand position conduit 37 is connected with conduits 19 and 39 and conduit 18 with discharge conduit 38 and conduit 42, while in the extreme right-hand position on the one hand conduits 37, 18 and 40 and on the other hand conduits 19, 38 and 41 are inter-connected.

Shut-off member 32 has three cylindrical shutting-off piston parts and, as positions of rest, also only has the extreme left-hand and the extreme right-hand position. In the extreme left-hand position on the one hand conduits 41 and 43 and on the other hand conduits 40 and 44 are inter-connected while in the extreme right-hand position conduits 39 and 43 and on the other hand conduits 42 and 44 are inter-connected.

A manually controlled switch member 47 which may be coupled with shaft 2 of manually controlled member 1 by a connection 48, switches an electric switch when a change must be effected from steaming ahead to steaming astern or vice versa. Consequently solenoid 33 or 34 will be energized, pulling the shut-off member 31 to its opposite position.

Adjusting rod 28 has connected to it a contact 49 which makes an electrical connection with one or the other of two contact strips 50, 51 electrically connected with solenoids 35 and 36 respectively. In case the adjusting rod 28 is displaced in such a manner that the contact 49 of one of the contact strips 50, 51 switches to the other, solenoid 35 or 36 is energized, which moves shut-off member 32 to the other extreme position.

The operation of this device is as follows: Supposing all parts are in the position shown and that with adjusting lever 1 a certain adjustment in the steaming ahead range has been selected. Hydraulic medium enters through 37, leaves through the space for shut-off member 31 to conduit 19 and so arrives in casing 13. In case a change of conditions occurs as a consequence of which the number of revolutions of the driving engine varies, the centrifugal governor varies the fuel adjustment at 10 and thereby causes the slide valve 14 to be displaced. Assume that the number of revolutions drops and that consequently the fuel supply is increased by the centrifugal governor 7 to keep the number of revolutions up to the mark. Slide valve 14 then moves to the left and the hydraulic medium, flowing through conduit 19, can flow to the adjusting cylinder 24 for the blade pitch through conduit 21, while from this adjusting cylinder hydraulic medium can flow away through conduit 20 to conduit 18 and so to discharge 38. The pitch of the blades consequently decreases, as a result of which the torque decreases, the number of revolutions tends to increase and consequently the fuel supply tends to decrease by the action of the centrifugal governor. Thus one is able to operate the plant with optimum efficiency in any working condition, the pitch of the blades always assuming a value which is adapted thereto.

If, with the manually controlled lever 1 one switches on a different power, the bush of centrifugal governor 7 is differently adjusted while, in addition, slide casing 13 is displaced. Thus a new number of revolutions and a new fuel quantity are adjusted which are optimum for the now adjusted power situation. The pitch adjustment continues until slide valve 14 is back in the center position with regard to casing 13 which is now displaced.

If with lever 1 a reverse is made from "ahead" to "astern" switch 47 too is reversed. As a result thereof shut-off member 31 moves to the right-hand position. As long as the pitch of the blades is still in "ahead" direction, shut-off member 32 remains in the position shown. The hydraulic medium supplied through 37 can now flow through conduit 18 to casing 13 and also through connecting conduit 40 and conduit 44 to the right-hand side of adjusting cylinder 24. Piston 27, as a result of the hydraulic medium supplied through conduit 44, will now move in the "astern" direction. In case partial load of the driving engine occurs during this movement regulating slide valve 17 will occupy a position shifted to the right, with regard to casing 13. As a result thereof the hydraulic medium will also be led to cylinder 24 via conduit 21, resulting in the movement of piston 27 and therefore the adjustment of the pitch being accelerated. The other way round, in case of overload of the driving engine the adjusting speed will be slowed down. The throttling members 23, 25, 45 and 46 have been adjusted in such a manner that the supply of hydraulic medium through conduit 44 to the adjusting cylinder dominates a possible supply through conduit 20 to the other side of the adjusting cylinder. In this case the hydraulic medium can always flow away from the left-hand side of the adjusting cylinder through conduit 43, connecting conduit 41 and discharge 38.

As soon as contact 49 on adjusting rod 28 reaches contact strip 51, which occurs when the blades have indeed reached an "astern" pitch, solenoid 36 is energized, shut-off member 32 is pulled to the right and now, in essence, the same condition is achieved as shown in the drawing, with this difference, that the flow of hydraulic medium through conduit 37 always flows to conduit 18, while conduit 19 functions as discharge. Conduits 43 and 44 are now shut off by shut-off member 31 and 32. Now adjusting piston 27, in case the number of revolutions is too high or too low, will move in a direction opposite to the direction in which it would move with a position of parts 31 and 32 as shown.

Sometimes it is necessary to rotate the driving engine without imparting energy to the water. Then, consequently the propeller blades must be in neutral position. To this end one can place lever 1 in the lowest point of the power range and the adjustment is then selected in such a manner that the adjusted value of the fuel supply is just slightly too low for letting the driving engine produce the shaft torque required by the propeller in neutral position. This means that the slide valve casing 13 is moved so far to the right that slide valve 14 remains displaced to the left with regard thereto under the influence of centrifugal governor 7. This will give an impulse towards smaller pitch, but as soon as the neutral position is passed, contact 49 will cause the displacement of shut-off member 32, as a result of which the pitch is again changed in opposite direction through conduit 43 or 44. Thus shut-off member 32 as well as the pitch of the blades keep on oscillating, the latter with a very small amplitude. This oscillation is further damped as a result of the air chambers to the left and to the right of slide valve 32 being connected via very narrow channels with the surroundings.

To adjust the throttle openings 23, 25, 45, 46 one can first completely close 23 and 25 and then bring lever 1 from full speed ahead to full speed astern (whilst steaming full speed ahead) or vice versa. Thereafter the throttle openings 46 and 45 are adjusted in such a manner that the driving engine is slightly overloaded.

Subsequently slide valve 14 is released from the fuel control connection 9 and consequently from 12, and is moved to the center position. Then quickly switch in such a manner that slide valve 14 suddenly arrives in the extreme left-hand position with regard to casing 13. Thus one is able to adjust throttling members 23 and 25 so, that conduits 43 and 44 only just move the adjusting rod 28 in the direction required for the reversal against the influence of slide valve 14.

Naturally, the described electric part of the system might also be hydraulic, pneumatic or mechanical. The hydraulic system as shown and described might operate pneumatically or electrically, but a hydraulic embodiment has the advantage that the adjusting speed can be rather high in a system which is nevertheless stable and therefore non-oscillating.

What I claim is:

1. An adjusting and control device for a propulsion mechanism of a ship having a driving engine, a propeller with blades of adjustable pitch driven by said engine, means controlling the admission of a working fluid to the engine, and a speed-governing means having a part actuating the working fluid admission-controlling means and an adjustable part, said device comprising manual adjusting means having two cams, means actuated by one cam for adjusting the position of the adjustable part of the governing means, means actuated by the other cam for adjusting the position of the admission-controlling means to adjust them in a predetermined mutual relationship, and a flexible connection included in the means between the cam and the admission means, comprising cooperating valve and port means, in which in case of the admission means taking the adjusted position the port means are closed by the valve means so that the pitch of the propeller blades is not altered, whereas in case of the admission means deviating from the adjusted position with respect to the actual position, the valve means open the port means so as to adjust the pitch of the propeller blades in a direction causing a displacement of the admission means towards the adjusted position depending on the number of revolutions of the engine.

2. An adjusting and control device for a propulsion mechanism of a ship having a driving engine, a propeller with blades of adjustable pitch driven by said engine, means controlling the admission of a working fluid to the engine, and a speed-governing means having a part actuating the working fluid admission-controlling means and an adjustable part, which device is embodied so as to simultaneously adjust the pitch of the blades, the admission quantity of working fluid to the driving engine and the position of the adjustable part of the speed governing device, which latter device acts on the admission means for working medium, a flexible connection being included in the connection between the adjusting means for the working fluid and the admission means for such fluid to the driving engine, which flexible connection in case of the admission means deviating from the adjusted position with respect to the actual position, adjusts the pitch of the propeller blades in a direction causing a displacement of the admission means towards the adjusted position depending on the speed of the engine, the pitch adjustment taking place hydraulically, the flexible connection including a displaceable slide valve disposed in a displaceable casing having valve ports, one part of which casing being connected with an adjusting member and the other with the admission means for working medium to the driving engine, an inlet for hydraulic medium joining that casing and conduits running from ports in that casing to both sides of a hydraulic adjusting cylinder for the propeller blade adjustment, so that when the slide valve is disposed in a central position in said displaceable casing this shuts off the outlet ports to the adjusting cylinder with respect to the supply of hydraulic medium, said slide valve being provided with piston parts having axial extensions which close the outlet ports, the axial extensions in case of small deviations of the slide valve from the central position with respect to the casing allow the medium to pass throttlingly and in case of larger deviations less throttlingly.

3. An adjusting and control device for a propulsion mechanism of a ship having a driving engine, a propeller with blades of adjustable pitch driven by said engine, means controlling the admission of a working fluid to the engine, and a speed-governing means having a part actuating the working fluid admission-controlling means and an adjustable part, which device is embodied so as to simultaneously adjust the pitch of the blades, the number of revolutions of the driving machine and the power thereof, said device being embodied in such a manner that at least in the ranges of not too small a pitch of the blades it unequivocally imposes on the driving engine a prescribed relation between the number of revolutions and the power, so that the combination of driving engine and propeller operates with an efficiency which is optimum for all conditions, in which in case of reversing the adjustment from "ahead" to "astern" or vice versa a shut-off device operatively connected to the control device eliminates the influence of the control device on the pitch adjustment and changes the pitch of the blades in the direction for which adjustment is made, and in which upon the blades having reached this direction, an impulse derived from this fact switches over said shut-off device for again permitting the control device to influence the pitch adjustment, the pitch adjustment taking place hydraulically, a flexible connection being included in the connection between the adjusting means for the working fluid and the admission means for such fluid to the driving engine, said flexible connection including a displaceable slide valve disposed in a displaceable casing having ports, one part of said casing being connected with an adjusting member and the other with the admission means for working fluid to the driving engine, an inlet for hydraulic medium joining that casing, a hydraulic adjusting cylinder for the propeller blade adjustment, conduits running from the ports in said displaceable casing to both sides of said adjusting cylinder so that when the slide valve is disposed in a central position in said displaceable casing this shuts off the ports to the adjusting cylinder with respect to the supply of hydraulic medium, said shut-off device being disposed between said flexible connection and said adjusting cylinder and including fluid connections therebetween, said shut-off device at a change of the adjustment from "ahead" to "astern" or vice versa thereby shuts off the supply of hydraulic medium to the flexible connection and wherein when the blade position has reached the adjusted direction a switch impulse from the adjusting device reverses this shut-off device for again feeding hydraulic medium to the flexible connection.

4. A device according to claim 3, in which the shut-off device contains two shut-off members, one of which is operated by the adjusting device and the other by the impulse of the actual blade position derived from the adjusting device for the propeller blades.

5. A device according to claim 3, in which in the position of the shut-off device wherein the direction of the pitch of the blades does not coincide with the adjusted direction, this shut-off device leads hydraulic medium to the adjusting cylinder for the propeller blades in the direction in which the adjustment must be made, bypassing the flexible connection.

6. A device according to claim 3, in which in the position of the shut-off device wherein the direction of the pitch of the blades does not coincide with the adjusted direction, this shut-off device leads hydraulic medium to the adjusting cylinder for the propeller blades in the direction in which the adjustment must be made, bypassing the flexible connection, adjustable throttle members being provided in the conduits leading from the flexible connection and in fluid connections leading directly from the shut-off device to the adjusting cylinder, such that the total throttling in the supply path over the flexible connection to the adjusting cylinder is stronger than the throttling in the direct path via the shut-off device to the adjusting cylinder.

References Cited in the file of this patent

UNITED STATES PATENTS

| | | |
|---|---|---|
| 2,306,953 | Jung | Dec. 29, 1942 |
| 2,525,460 | Roesch | Oct. 10, 1950 |
| 2,588,371 | Englesson | Mar. 11, 1952 |
| 2,679,296 | Morain | May 25, 1954 |
| 2,777,525 | Liaaen | Jan. 15, 1957 |
| 2,878,880 | Gillespie | Mar. 24, 1959 |

FOREIGN PATENTS

| | | |
|---|---|---|
| 903,082 | France | Sept. 24, 1945 |